(12) United States Patent
Chen

(10) Patent No.: US 11,672,354 B1
(45) Date of Patent: Jun. 13, 2023

(54) INSERTING ASSEMBLED BEDSTEAD

(71) Applicant: ZHEJIANG ZHONGWEI SMART FURNITURE CO., LTD., Zhejiang (CN)

(72) Inventor: Zheng Chen, Zhejiang (CN)

(73) Assignee: ZHEJIANG ZHONGWEI SMART FURNITURE CO., LTD., Wenzhou (CN)

( * ) Notice: Subject to any disclaimer, the term of this patent is extended or adjusted under 35 U.S.C. 154(b) by 0 days.

(21) Appl. No.: 17/901,089

(22) Filed: Sep. 1, 2022

(30) Foreign Application Priority Data

Jul. 6, 2022 (CN) .......................... 202210790365.3

(51) Int. Cl.
*A47C 19/02* (2006.01)
*F16B 12/60* (2006.01)
*F16B 12/58* (2006.01)

(52) U.S. Cl.
CPC ............ *A47C 19/021* (2013.01); *F16B 12/58* (2013.01); *F16B 12/60* (2013.01)

(58) Field of Classification Search
CPC ....... A47C 19/021; A47C 19/00; A47C 19/02; F16B 12/58; F16B 12/60; F16B 12/00; F16B 12/54
See application file for complete search history.

(56) References Cited

U.S. PATENT DOCUMENTS

2017/0208954 A1\* 7/2017 Lee ...................... A47C 19/025

\* cited by examiner

*Primary Examiner* — Fredrick C Conley
(74) *Attorney, Agent, or Firm* — Cooper Legal Group, LLC

(57) ABSTRACT

The present application relates to a field of bedstead, particularly, relates to an inserting assembled bedstead, which includes a bed-head transverse piece, a middle transverse piece, a bed-tail transverse piece, two bedside longitudinal pieces, two bed-head supports, two middle supports and two bed-tail supports. Inserting pieces are provided at both ends of the bed-head transverse piece, the middle transverse piece, the bed-tail transverse piece and the bedside longitudinal pieces; the bed-head support and the bed-tail support are both provided with at least two sleeve pieces positioned by 90 degree relative to each other; the middle support is provided with at least three sleeve pieces adjacently positioned by 90 degree relative to each other.

9 Claims, 7 Drawing Sheets

INSERTING ASSEMBLED BEDSTEAD

CROSS-REFERENCE TO RELATED APPLICATION

This application claims the priority of China patent application serial no. 202210790365.3, filed on Jul. 6, 2022. The entirety of China patent application serial no. 202210790365.3 is hereby incorporated by reference herein and made a part of this specification.

TECHNICAL FIELD

The present application relates to a field of bedstead, particularly, relates to an inserting assembled bedstead.

BACKGROUND ART

A bedstead is a kind of common furniture for placing a mattress. With a popularity of shopping online, requirements for convenient storage and assembly of the bedstead are higher and higher.

In the existing assembled bedstead, the bedstead structure is designed to a plurality of foldable joint structures, and the bedstead is disassembled and folded when stored. During assembling, all foldable joint structures are unfolded and fixed with bolts.

For the above related technologies, the applicant believes that there are the following problems: additional tools for screwing bolts are required for an assembly worker; in addition, when the bedstead is assembled not in place, for example, when the bolts are screwed not tightly enough, the bedstead will be unstable and even falls apart, and makes a noise when shaking, etc.

SUMMARY

In order to solve the problems of inconvenient assembling and unstable installation of the existing bedstead, the present application provides an inserting assembled bedstead.

The inserting assembled bedstead provided in the present application adopts the following technical solutions.

The inserting assembled bedstead includes a bed-head transverse piece, a middle transverse piece, a bed-tail transverse piece, two bedside longitudinal pieces, two bed-head supports, two middle supports and two bed-tail supports; inserting pieces are provided at both ends of the bed-head transverse piece, the middle transverse piece, the bed-tail transverse piece and the bedside longitudinal piece, respectively; the bed-head supports and the bed-tail supports are both provided with at least two sleeve pieces positioned by 90 degree relative to each other; the middle support is provided with three sleeve pieces adjacently positioned by 90 degree relative to each other.

In the above technical solution, the inserting assembled bedstead is designed to be assembled by an inserting cooperation structure between the inserting pieces of the bed-head transverse piece, the middle transverse piece, the bed-tail transverse piece and the bedside longitudinal piece, and the sleeve pieces of the bed-head support, the middle support and the bed-tail support. When being stored, each piece can be disassembled and stored separately, making the storage volume smaller. When being assembled, only an inserting operation is needed to complete the assembling without special tools, and the assembling is more convenient, and there will be no series of problems caused by bolts not tightened.

In some embodiments, the bed-head transverse piece includes a bed-head transverse tube, the middle transverse piece includes a middle transverse tube, and the bed-tail transverse piece includes a bed-tail transverse tube; one side of the bed-tail transverse tube is fixedly provided with a bed-tail board; the two bedside longitudinal pieces include a bedside longitudinal tube, and opposite sides of the two bedside longitudinal pieces are fixedly provided with a bedside board; the bed-head transverse tube, the middle transverse tube, the bed-tail transverse tube and the bedside longitudinal tube are welded with the inserting pieces at both ends; the bed-head support includes a bed-head support rod made of a rectangular tube, and two adjacent surfaces of the bed-head support rod are fixedly provided with the sleeve pieces the middle support includes a middle support rod made of the rectangular tube, and three adjacent surfaces of the middle support rod are fixedly provided with the sleeve pieces; the bed-tail support includes a bed-tail support rod made of the rectangular tube, and two adjacent surfaces of the bed-tail support rod are fixedly provided with the sleeve pieces.

In the above technical solution, the inserting pieces are fixed at both ends of the transverse tube, so that both ends of the whole piece can be cooperated with the sleeve pieces of the support rod by the inserting pieces. The two sleeve pieces provided at the bed-head support rod are configured to cooperate with the inserting pieces of the bed-head transverse piece and the bedside longitudinal piece, and the three sleeve pieces provided at the middle support rod are configured to cooperate with the inserting pieces of the bedside longitudinal piece and the middle transverse piece, and the three sleeve pieces provided at the bed-tail support rod are configured to cooperated with the inserting pieces of the bedside longitudinal piece and the bed-tail transverse piece.

In some embodiments, a support board assembly is further included; a first fastening tape is fixed at an upper side of the bedside longitudinal tube; the support board assembly includes a plurality of wooden transverse strips and two second fastening tapes; the two second fastening tapes are respectively fixed at one end of individual wooden transverse strips, and the first fastening tape is in adhesive connection with the second fastening tape.

In the above technical solution, all the wooden transverse strips of the support board assembly are connected together by the second fastening tapes, so that there is no need to take and locate each wooden transverse strip when laying the support board assembly, and the assembling is more convenient. Additionally, the cooperating structure of the first fastening tape and the second fastening tape makes disassembling, assembling and replacement of the support board assembly more convenient.

In some embodiments, two middle longitudinal pieces are further included; the middle longitudinal piece includes a middle longitudinal tube and the inserting pieces fixed at both ends of the middle longitudinal tube; one side of the bed-head transverse tube facing the bed-tail is fixedly provided with the sleeve piece in the middle, both sides of the middle transverse tube are fixedly provided with the sleeve pieces in the middle, and one side of the bed-tail transverse tube facing the bed-head is fixedly provided with the sleeve piece in the middle.

In the above technical solution, the middle longitudinal piece is configured to be connected with the sleeve pieces fixed at the bed-head transverse tube, the middle transverse tube and the bed-tail transverse tube, so that the support board can be supported in a longitudinal direction of the bedstead in the middle.

In some embodiments, the inserting piece includes a transition board and fixed boards connected to both ends of the transition board; one end of the fixed board away from the transition board is formed with a transition notch in the middle; a portion of the fixed board under the transition notch is folded to form an inclined guide board, and the inclined guide board is inclined towards the transition board from top to bottom; the inclined guide boards formed by folding the two fixed boards are located in a same plane, and there is a gap between the two inclined guide boards; the sleeve piece includes an attaching board weld to the bed-head transverse tube, and both sides of the attaching board are folded to form extension boards; an end of the extension board away from the attaching board extends to form an inclined pressing board that is inclined from top to bottom towards the attaching board; the two inclined pressing boards are in a same plane, and there is a gap between the two inclined pressing boards; and the inserting pieces are configured to be inserted into the sleeve pieces.

In the above technical solution, the fixed board is provided as a welding surface of the inserting pieces, and the inclined guide board formed by folding a portion of the fixed board under the transition notch is cooperated with the inclined pressing board provided at the sleeve pieces, so that the bedstead always bears the vertical force during use. The matched part of the inclined guide board and the inclined pressing board is continuously pressed under the force in a vertical direction, so that the connection in bedstead is more tightly after continuous use. The gap between the two inclined guide boards and the two inclined pressing boards makes it possible for the two inclined guide boards can be pressed closely or the two inclined pressing boards can be held apart to make up, even if there is a deformation of the inserting piece and the sleeve piece during welding. And the deformed inserting piece can not only be inserted into the sleeve piece, but also abut against an inner wall of the sleeve piece after deforming adjustment.

In some embodiments, a headboard assembly is included; the headboard assembly includes two inserting pieces; the bed-head support includes a bed-head support rod made of a rectangular tube, and three adjacent surfaces of the head support rod are fixedly provided with the sleeve piece.

In the above technical solution, the headboard assembly can also be assembled and fixed by a cooperation of the inserting piece and the sleeve piece, which is more convenient to use.

In some embodiments, the headboard assembly includes a rectangular frame formed by welding two vertical square tubes and two horizontal square tubes together, a headboard fixed to one side of the rectangular frame towards the bed-tail, and four bed-head side boards fixed at an upper side, a lower side, a left side and a right side of the headboard, respectively, and surrounding the rectangular frame; a through hole is formed in the lower bed-head side board at a position close to each of the two vertical square tubes, and an adjusting square tube is provided within each through hole; a plurality of adjusting holes penetrating the headboard are uniformly arranged in each of the vertical square tubes along a length direction, and two perforations are arranged at intervals in the adjusting square tube; a relative position between the adjusting square tube and the vertical square tube are fixed by a fastener passing through the two perforations and the adjusting holes; and two inserting pieces are fixed to two adjusting square tubes, respectively.

In the above technical solution, other parts of the bedstead all can be put into an internal space of the headboard assembly after being disassembled, and the adjusting square tubes can also be put into the internal space, so that it is more convenient for storing, packaging and transporting. At the same time, the distance between the bed-head side board and the bed-head transverse piece can be changed by aligning the perforations of the adjusting squares tube with different adjusting holes to adapt to mattresses with different thicknesses.

In some embodiments, the inserting piece includes a welding section and an inserting section; the welding section is configured as a U-shape, and both ends of the U-shape welding section are in the same plane for being fixed by welding; the inserting section is configured as an funnel shape and integrally formed with the welding section; one side of the inserting section is formed with a first gap running through the whole inserting section; the sleeve piece is configured as a funnel shape with a gradually decreasing size from top to bottom; one side of the sleeve piece is formed with a second gap running through the whole sleeve piece.

In the above technical solution, the inserting piece and the sleeve piece are both configured as the funnel shape structure cooperated with each other, so that the inserting piece and the sleeve piece is continuously pressed under the force in a vertical direction during use, thus the bedstead becomes more and more stable during use. Additionally, the first gap and the second gap are provided, so that even if there is a deformation of the inserting piece and the sleeve piece during welding, the deformation can still be adapted by the cooperation of the first gap and the second gap.

In some embodiments, the first gap is located at one side of the inserting section towards an U-shape opening of the welding section; a projection of a first upper outer ring and a projection of a first lower outer ring of the inserting section in a vertical direction are internally tangent with each other, forming a first tangent point at one side of the inserting section away from the first gap; a projection of a second upper outer ring and a projection of a second lower outer ring of the sleeve piece in a vertical direction are internally tangent with each other, forming a second tangent point at one side of the sleeve piece away from the second gap; a part to be welded with the sleeve piece is formed with a positioning groove, and a length of the positioning groove is same as a length of a welding side of the sleeve piece; and an inner concave surface of the positioning groove is an arc surface attached to an outer surface of the sleeve piece.

In the above technical solution, the outer ring projections of the upper and lower ends of the inserting section and the sleeve piece are tangent, so that the sleeve piece can be directly weld at this side without providing other additional structures. On one hand, the processing difficulty of the sleeve piece is reduced, on the other hand, a deformation error caused by the welding of the sleeve piece is reduced, and a problem of an installation difficulty caused by an angular deviation of the inserting cooperation is solved. A welding position and an angle of the sleeve piece are determined by the positioning groove.

In some embodiments, the inserting piece includes a transition board and two fixed boards connected to both ends of the transition board and perpendicular to the transition board; one end of each of the two fixed boards away from the transition board is formed with a transition notch; a portion of each of the fixed boards under the transition notch is folded to form an inclined guide board, and the inclined guide board is inclined towards the transition board from top to bottom; there is a gap between a lower end of the inclined guide board and the transition board; the two inclined guide boards are in a same plane, and there is a gap between the two inclined guide boards; the sleeve piece includes an attaching board, and both sides of the attaching board are folded to form extension boards; the extension board is configured as a right triangle, and one side of the extension board connected with the attaching board and an upper side of the extension board are right angle sides thereof; sides of the two extension boards away from the attaching board both extend to form inclined pressing boards and the inclined pressing boards are inclined towards the attaching board from top to bottom; a lower end of the inclined pressing board is welded to the attaching board; an angle formed between the inclined pressing board and the attaching board is equal to an angle between the inclined guide board and the transition board; two inclined pressing boards are in a same plane, and there is a gap between the two inclined pressing boards.

In the above technical solution, The gap between the two inclined guide boards and the two inclined pressing boards makes it possible for the two inclined guide boards can be pressed closely or the two inclined pressing boards can be held apart to make up even if there is a deformation of the inserting piece and the sleeve piece during welding, and the deformed inserting piece can not only be inserted into the sleeve piece, but also abut against an inner wall of the sleeve piece after deforming adjustment. By welding the inclined pressing board and the lower end of the extension board together, and by providing a gap between the transition board and the lower end of the inclined guide board, on one hand, a situation that the inserting piece cannot be smoothly inserted into the sleeve piece caused by a machining error and the deformation after welding can be avoided; on the other hand, after the bedstead is assembled, the inserting piece is in the sleeve piece, even if a deformation occurs under force due to long term use, the deformation will stop when the inclined guide board abuts against the transition board, and there will be no significant sinking of the bedstead, and the bedstead will be not inclined due to the excessive deformation of a support point.

In summary, the present application has at least one of the following beneficial technical effects:

the bedstead provided in the present application may be assembled only by inserting operation, without using special tools, so the assembling is more convenient, and there will be no series of problems caused by bolts not tightened; additionally, the inserting cooperation structure makes the bedstead more and more stable during use.

DETAILED DESCRIPTION

The present application is further described in detail below in combination with FIGS. 1-14.

Embodiment 1

Figure 1:
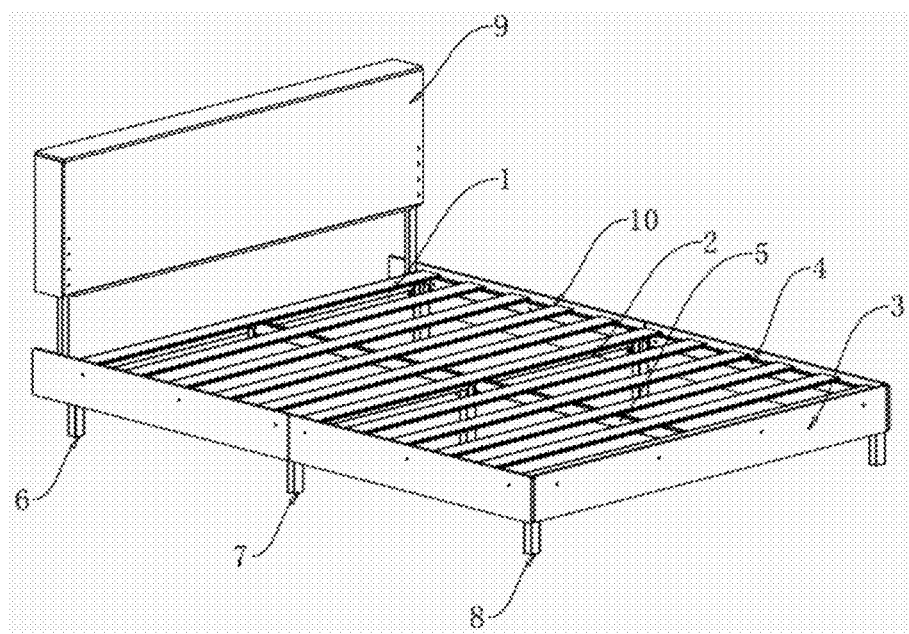
FIG. 1 is a structural schematic diagram of embodiment 1.

As shown in FIG. 1, an inserting assembled bedstead includes a bed-head transverse piece 1, a middle transverse piece 2, a bed-tail transverse piece 3, two bedside longitudinal pieces 4 located at both sides of a bed, a middle longitudinal piece 5 located in the middle of the bed, two bed-head supports 6, two middle supports 7, two bed-tail supports 8, a headboard assembly 9 and a support board assembly 10. Upper and lower directions expressed in the embodiment are consistent with the upper and lower directions when the bedstead is used after being assembled.

Figure 2:
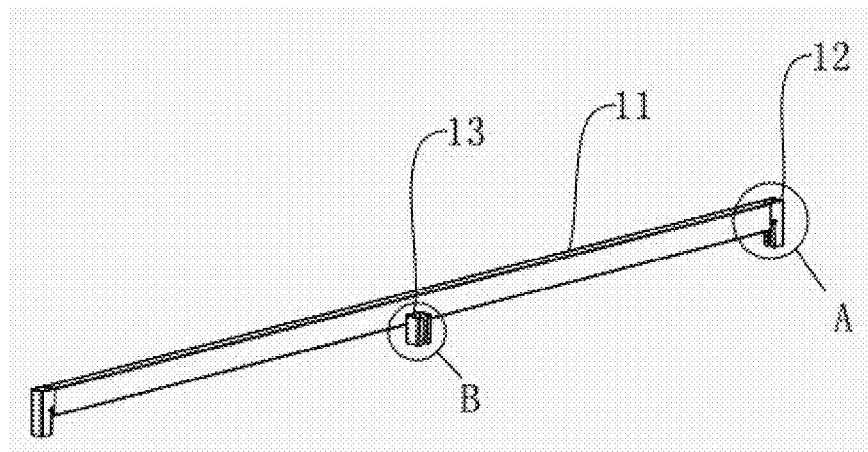
FIG. 2 is a structural schematic diagram of a bed-head transverse piece in embodiment 1.
Figure 3:
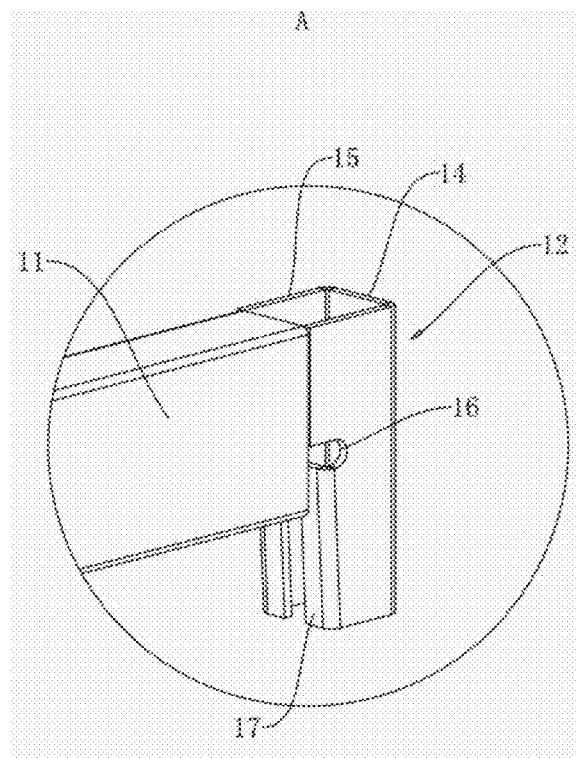
FIG. 3 is an enlarged view of area A in FIG. 2.
Figure 4:
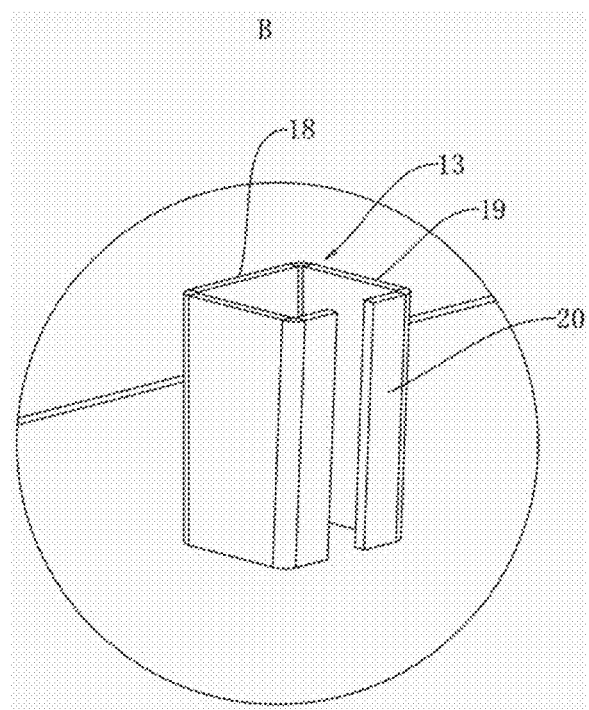
FIG. 4 is an enlarged view of area B in FIG. 2.

As shown in FIG. 2, the bed-head transverse piece 1 includes a bed-head transverse tube 11, inserting pieces 12 connected at both ends of the bed-head transverse tube 11 and an sleeve piece 13 connected at a side of the bed-head transverse tube 11 towards the bed-tail in the middle. The bed-head transverse tube 11 is a rectangular tube, of which a wider surface is a vertical surface when the bedstead is used. As shown in FIG. 3, the inserting piece 12 includes a transition board 14 and two fixed boards 15 connected at both ends of the transition board 14 and perpendicular to the transition board 14. When the bedstead is assembled and used, the transition plate 14 is arranged along the vertical direction. an end of each fixed board 15 away from the transition board 14 is formed with the transition notch 16 in the middle. A portion of the fixed board 15 above the transition notch 16 is welded to the bed-head transverse tube 11, and a portion of the fixed board 15 under the transition notch 16 is folded to form an inclined guide board 17, and the inclined guide board 17 is inclined towards the transition board 14 from top to bottom. The two inclined guide boards 17 formed by folding the two fixed boards 15 are in a same plane, and there is a gap between the two inclined guide boards 17. As shown in FIG. 4, the sleeve piece 13 includes an attaching board 18 weld to the bed-head transverse tube 11, and both sides of the attaching board 18 are folded to form extension boards 19. An end of the extension board 19 away from the attaching board 18 extends to form an inclined pressing board 20 and the inclined pressing board 20 is inclined towards the attaching board 18 from top to bottom. The two inclined pressing boards 20 are in a same plane, and there is a gap between the two inclined pressing boards 20.

Figure 5:
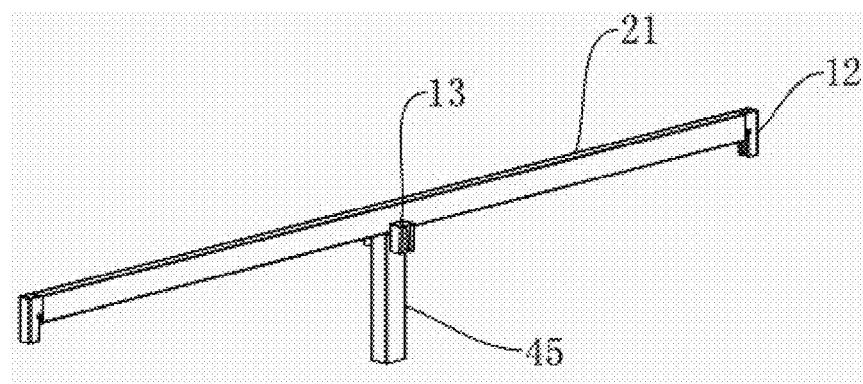
FIG. 5 is a structural schematic diagram of a middle transverse piece in embodiment 1.

As shown in FIG. 5, the middle transverse piece 2 includes a middle transverse tube 21, the inserting pieces 12 connected at both ends of the middle transverse tube 21, two sleeve pieces 13 connected to both sides of the middle transverse tube 21 in the middle, and a center support rod 45 connected to the bottom of the middle transverse tube 21 in the middle. A shape and a size of the middle transverse tube 21 are same as that of the bed-head transverse tube 11. Structures of the inserting piece 12 and the sleeve piece 13 of the middle transverse piece 2 are same as the structures of the inserting piece 12 and the sleeve piece 13 of the bed-head transverse piece 1. The center support rod 45 is a rectangular tube, and an upper end of the center support rod 45 is welded to the middle transverse tube 21.

Figure 6:
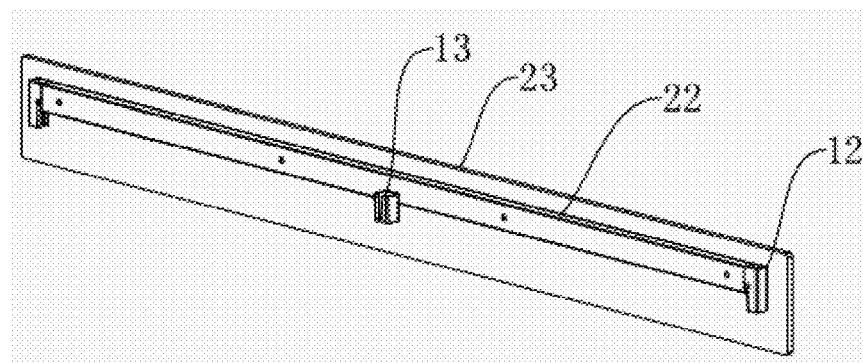
FIG. 6 is a structural schematic diagram of a bed-tail transverse piece in embodiment 1.

As shown in FIG. 6, the bed-tail transverse piece 3 includes a bed-tail transverse tube 22, a bed-tail board 23 connected to one side of the bed-tail transverse tube 22 away from the bed-head, the inserting pieces 12 welded to both ends of the bed-tail transverse tube 22 and the sleeve piece 13 weld to one side of the bed-tail transverse tube 22 towards the bed-head in the middle. A shape and a size of the bed-tail transverse tube 22 are same as that of the bed-head transverse tube 11. A side surface of the bed-tail transverse tube 22 is formed with a plurality of through holes penetrating the bed-tail transverse tube 22, and the bed-tail board 23 is fixed at a side surface of the bed-tail transverse tube 22 by connecting pieces passing through the bed-tail board 23 and cooperating with the through holes. A length of the bed-tail board 23 is greater than that of the bed-tail transverse tube 22. The structures of the inserting piece 12 and the sleeve piece 13 of the bed-tail transverse piece 3 are same as the structures of the inserting piece 12 and the sleeve piece 13 of the bed-head transverse piece 1.

Figure 7:
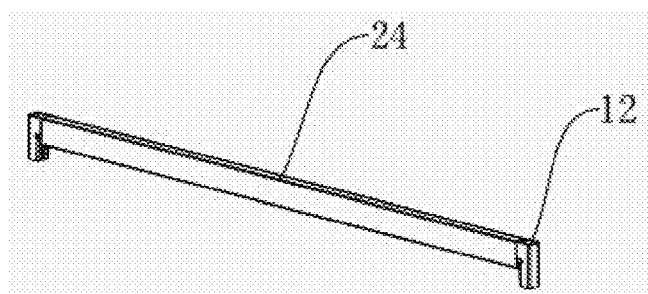
FIG. 7 is a structural schematic diagram of a middle longitudinal piece in embodiment 1.

As shown in FIG. 7, the middle longitudinal piece 5 includes a middle longitudinal tube 24 and the inserting pieces 12 welded to both ends of the middle longitudinal tube 24. A cross section shape of the middle longitudinal tube 24 is same as that of the bed-head transverse tube 11, and the only difference between the middle longitudinal tube 24 and the bed-head transverse tube 11 is the length. The structure of the inserting piece 12 of the middle longitudinal piece 5 is same as the structure of the inserting piece 12 of the bed-head transverse piece 1.

Figure 8:
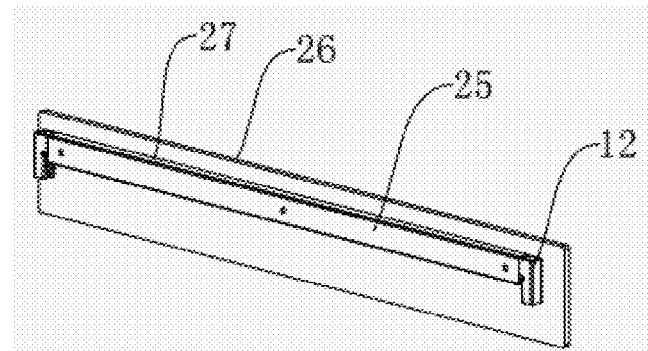
FIG. 8 is a structural schematic diagram of a bedside longitudinal piece in embodiment 1.

As shown in FIG. 8, the bedside longitudinal piece 4 includes a bedside longitudinal tube 25, the inserting piece 12 weld to both ends of the bedside longitudinal tube 25, and a bedside board 26 connected to one side of the bedside longitudinal tube 25 away from the middle longitudinal piece 5. The shape and the size of the bedside longitudinal tube 25 are same as that of the middle longitudinal tube 24, and a first fastening tape 27 is affixed to an upper side of the bedside longitudinal tube 25. A side surface of the bedside longitudinal tube 25 is formed with a plurality of through holes penetrating the middle longitudinal tube 24, and the bedside board 26 is fixed at a side surface of the bedside longitudinal tube 25 by connecting pieces passing through the bedside board 26 and cooperating with the through holes. The length of the bedside board 26 is greater that of the bedside longitudinal tube 25.

Figure 9:
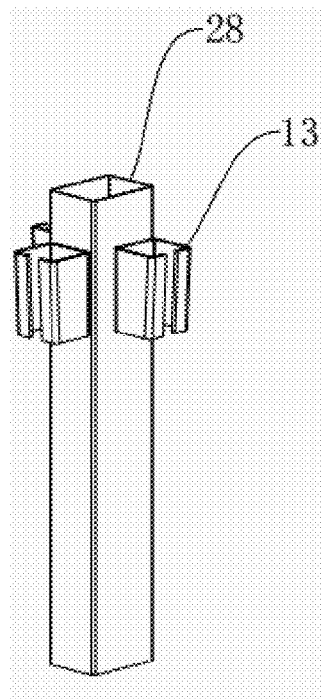
FIG. 9 is a structural schematic diagram of a bed-head support in embodiment 1.

As shown in FIG. 9, the bed-head support 6 includes a bed-head support rod 28 made of the rectangular tube and three sleeve pieces 13 weld to three sides of the bed-head support rod 28. The structure of the sleeve piece 13 of the bed-head support 6 is same as the structure of the sleeve piece 13 of the bed-head transverse piece 1. The three sleeve pieces 13 are located at the same height, and there is a certain distance between the sleeve pieces 13 and the upper end of the bed-head support rod 28.

Figure 10:
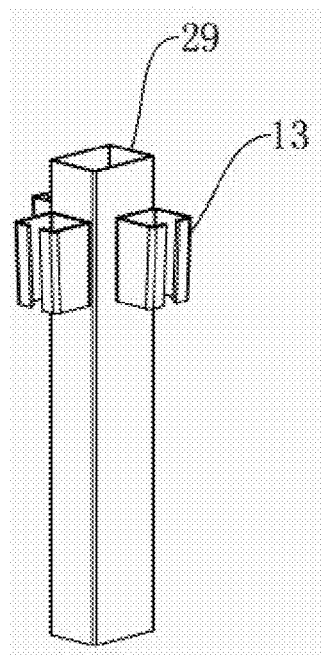
FIG. 10 is a structural schematic diagram of a middle support in embodiment 1.

As shown in FIG. 10, the middle support 7 includes a middle support rod 29 made of the rectangular tube and three sleeve pieces 13 weld to three sides of the middle support rod 29. The structure and a fixed height of the sleeve piece 13 of the middle support 7 are same as that of the sleeve piece 13 of the bed-head support 6.

Figure 11:
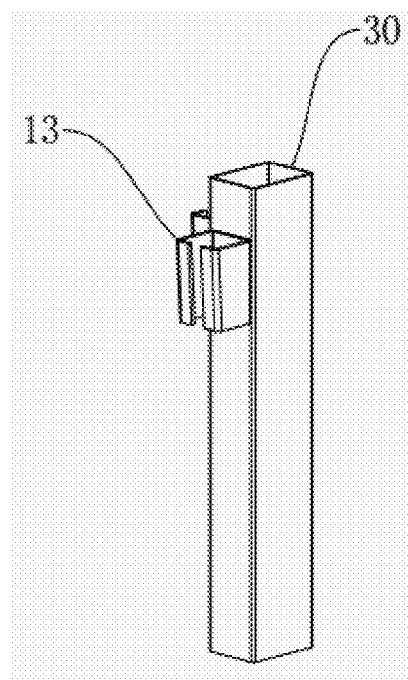
FIG. 11 is a structural schematic diagram of a bed-tail support in embodiment 1.

As shown in FIG. 11, the bed-tail support 8 includes a bed-tail support rod 30 made of the rectangular tube and two sleeve pieces 13 welded to the adjacent side of the bed-tail support rod 30. The structure and the fixed height of the sleeve piece 13 of the bed-tail support 8 is same as that of the sleeve piece 13 of the bed-head support 6.

Figure 12:
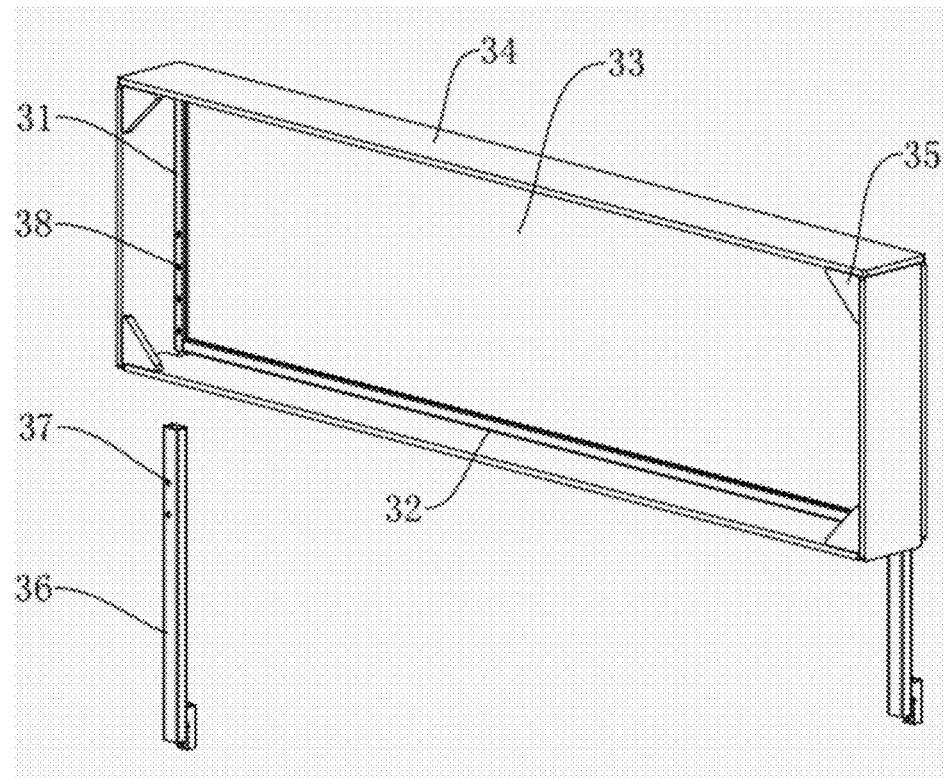
FIG. 12 is a structural schematic diagram of a headboard assembly in embodiment 1.

As shown in FIG. 12, the headboard assembly 9 includes a rectangular frame formed by welding two vertical square tubes 31 and two horizontal square tubes 32 together, a headboard 33 fixed at a side of the rectangular frame towards the bed-tail, four bed-head side boards 34 fixed at an upper side, a lower side, a left side and a right side of the headboard 33, respectively, and surrounding the rectangular frame. A side of the bed-head side board 34 away from the headboard 33 is connected to the adjacent bed-head side board 34 by triangular strengthen boards 35, which has an effect of strengthening. The distance between the two vertical bed-head side board 34 is greater than the length of the bedside board 26 and the bed-tail board 23.

As shown in FIG. 12, a through hole is formed in the lower bed-head side board 34 at a position close to each of the two vertical square tubes 31, and an adjusting square tube 36 is provided within each through hole. Four adjusting holes 38 penetrating the headboard 33 are uniformly arranged in the vertical square tube 31 along a length direction, and two perforations 37 are arranged at intervals in the adjusting square tube 36. A relative position between the adjusting square tube 36 and the vertical square tube 31 are fixed by a fastener passing through the two perforations 37 and the adjusting holes 38.

Figure 13:
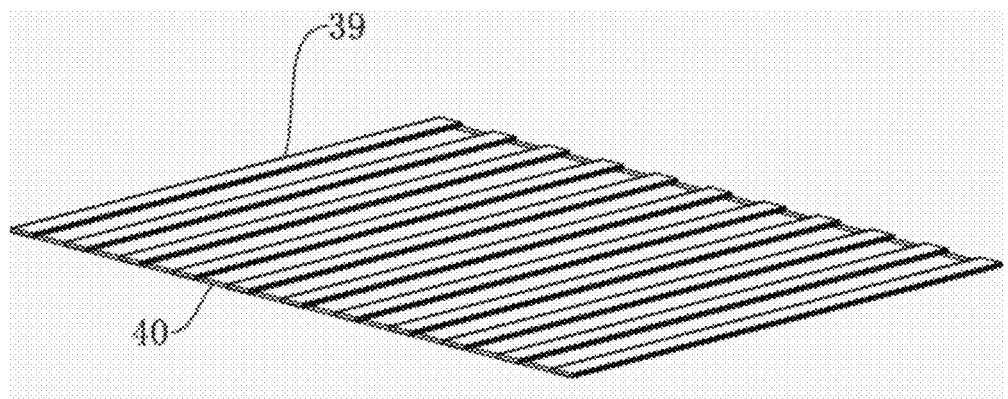
FIG. 13 is a structural schematic diagram of a support board assembly in embodiment 1.

As shown in FIG. 13, the support board assembly 10 includes a plurality of wooden transverse strips 39 and two second fastening tapes 40. The two second fastening tapes 40 located at both ends of all the wooden transverse strips 39 are stuck together with all the wooden transverse strips 39. One of the first fastening tape 27 and the second fastening tape 40 is a loop surface, and the other is a hook surface, so that the first fastening tape 27 and the second fastening tape 40 will be affixed together when they are attached.

When assembling and using, the inserting pieces of the bed-tail transverse piece 3 and the bedside longitudinal piece 4 are inserted into the two sleeve pieces 13 of the bed-tail support 8; the inserting pieces 12 of the two bedside longitudinal pieces 4 and the middle support 7 are inserted into the three sleeve pieces 13 of the middle support 7; the inserting pieces 12 of the bed-head transverse piece 1, the bedside longitudinal piece 4 and the headboard assembly 9 are inserted into the three sleeve pieces 13 of the bed-head support 6; the inserting pieces 12 of the two middle longitudinal pieces 5 are inserted into the sleeve pieces 13 of the bed-head transverse piece 1, the middle transverse piece 2 and the bed-tail transverse piece 3. At this time, an end surface of the bed-tail board 23 faces the side surface of the bedside board 26. The support board assembly 10 is connected with the bedside longitudinal piece 4 by laying the support board assembly 10 and a cooperation of the second fastening tape 40 and the first fastening tape 27, so that the complete bedstead is formed by assembling. During use, the bedstead is always under downward force. Additionally, due to the inclined arrangement of the inclined pressing board 20 of the inserting piece 12 and the inclined pressing board 20 of the sleeve piece 13, an inserting connection between the two will be tighter and tighter, and the bedstead will not be unstable and the noise will not be made during moving caused by loose matching.

When storing, the bed-head transverse piece 1, the middle transverse piece 2, the bed-tail transverse piece 3, the two bedside longitudinal pieces 4, the middle longitudinal piece 5, the two bed-head supports 6, the two middle supports 7 and the two bed-tail supports 8 are all stored in the space formed by the headboard 33 and the bed-head side board 34 of the headboard assembly 9.

Embodiment 2

Figure 14:
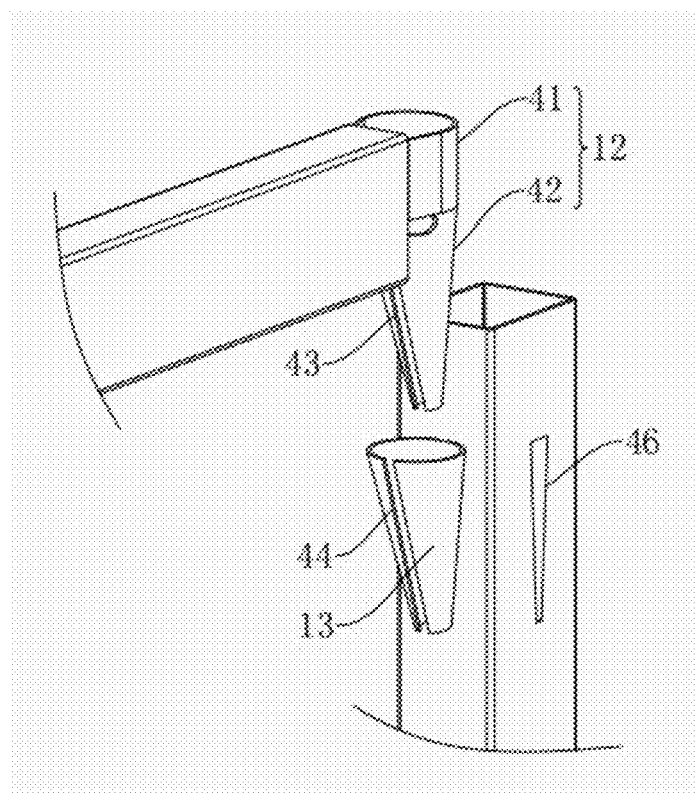
FIG. 14 is a structural schematic diagram of embodiment 2.

The inserting assembled bedstead in this embodiment is same as that in embodiment 1 except the structures of the inserting piece 12 and the sleeve piece 13, as well as the structure of the position where the sleeve piece 13 is weld. As shown in FIG. 14, the inserting piece 12 includes a welding section 41 and an inserting section 42. The welding section 41 is configured as a U-shape, and both ends of the U-shape are in the same plane for welding. The inserting section 42 is configured as an inclined funnel shape integrally formed with the welding section 41, and the inserting section 42 gradually becomes smaller from top to bottom. One side of the inserting section 42 towards an U-shape opening of the welding section 41 is formed with a first gap 43 running through the whole inserting section 42. A projection of a first upper outer ring and a projection of a first lower outer ring of the inserting section 42 in a vertical direction are internally tangent with each other, forming a first tangent point at one side of the inserting section 42 away from the first gap 43. The sleeve piece 13 is configured as a inclined funnel shape with a gradually decreasing size from top to bottom. A projection of a second upper outer ring and a projection of a second lower outer ring of the sleeve piece 13 in the vertical direction are internally tangent with each other, and the internally tangent side is defined as a welding side. One side of the sleeve piece 13 away from the welding side is formed with a second gap 44. The positions of all parts to be welded with the sleeve piece 13 are formed with a positioning groove 46, and the length of the positioning groove 46 is same as the length of the welding side of the sleeve piece 13. An inner concave surface of the positioning groove 46 is an arc surface attached to an outer surface of the sleeve piece 13.

Embodiment 3

Figure 15:
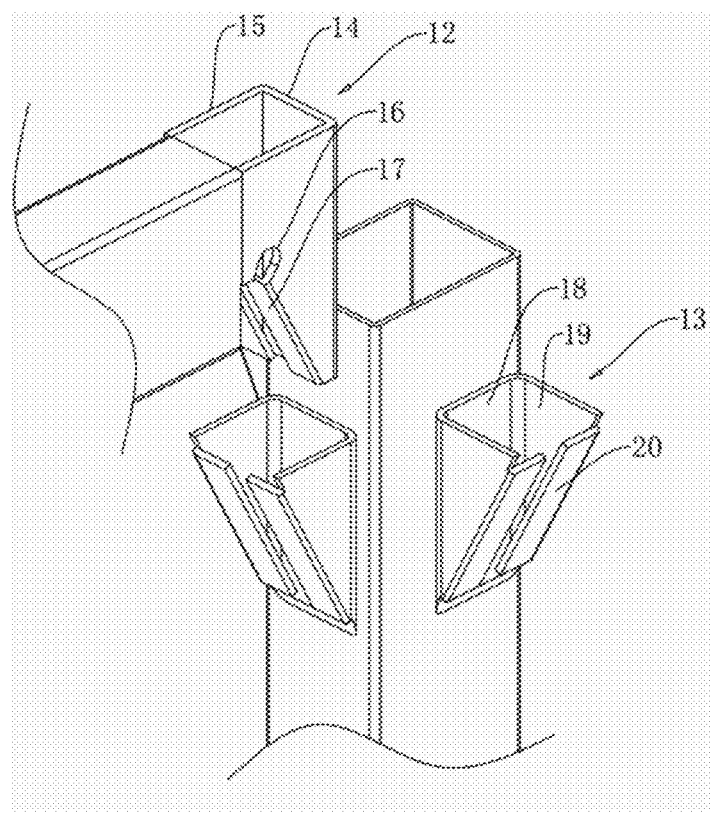
FIG. 15 is a structural schematic diagram of embodiment 3.

As shown in FIG. 15, the inserting assembled bedstead in this embodiment is same as that in embodiment 1 except the structures of the inserting piece 12 and the sleeve piece 13. As shown in FIG. 15, the inserting piece 12 includes a transition board 14 and two fixed boards 15 connected to both sides of the transition board 14 and perpendicular to the transition board 14. One end of each fixed board 15 away from the transition board 14 is formed with the transition notch 16 in the middle. A portion of each of the fixed boards 15 under the transition notch 16 is folded to form an inclined guide board 17, and the inclined guide board 7 is inclined towards the transition board 14 from top to bottom. There is a gap between the lower end of the inclined guide board 17 and the transition board 14. The two inclined guide boards 17 are in the same plane, and there is a gap between the two inclined guide boards 17.

The sleeve piece 13 includes an attaching board 18, and both sides of the attaching board 18 are folded to form extension boards 19. The extension board 19 is configured as a right triangle, and one side of the extension board 19 connected with the attaching board 18 and an upper side of the extension board 19 are the right angle sides thereof. Sides of each extension boards 19 away from the attaching board 18 both extends to form inclined pressing boards 20 that are inclined towards the attaching board 18 from top to bottom. The lower end of the inclined pressing board 20 is welded to the attaching board 18. An angle formed between the inclined pressing board 20 and the attaching board 18 is equal to an angle between the inclined guide board 17 and the transition board 14. Two inclined pressing boards 20 are in a same plane, and there is a gap between the two inclined pressing boards 20.

The above are the preferred embodiments of the present application, which are not intended to limit the protection scope of the present application. Therefore, all equivalent changes made according to the structure, the shape and the principle of the present application should fall in the protection scope of the present application.

What is claimed is:

1. An inserting assembled bedstead, comprising a bed-head transverse piece, a middle transverse piece, a bed-tail transverse piece, two bedside longitudinal pieces, two bed-head supports, two middle supports and two bed-tail supports, wherein, inserting pieces are provided at both ends of the bed-head transverse piece, the middle transverse piece, the bed-tail transverse piece and the two bedside longitudinal pieces; the two bed-head supports and the two bed-tail supports are provided with at least two sleeve pieces positioned by 90 degrees relative to each other; the two middle supports are provided with three of the sleeve pieces adjacently positioned by 90 degrees relative to each other;

the bed-head transverse piece comprises a bed-head transverse tube; the middle transverse piece comprises a middle transverse tube; the bed-tail transverse piece comprises a bed-tail transverse tube; one side of the bed-tail transverse tube is fixedly provided with a bed-tail board; each of the two bedside longitudinal pieces comprises a bedside longitudinal tube; opposite sides of the two bedside longitudinal pieces are fixedly provided with a bedside board; the bed-head transverse tube, the middle transverse tube, the bed-tail transverse tube and the bedside longitudinal tube are welded with the inserting pieces at both ends; each of the two bed-head supports comprises a bed-head support rod made of a rectangular tube, and two adjacent surfaces of the bed-head support rod are fixedly provided with the sleeve piece; each of the two middle supports comprises a middle support rod made of the rectangular tube, and three adjacent surfaces of the middle support rod are fixedly provided with the sleeve piece; and each of the two bed-tail supports comprises a bed-tail support rod made of the rectangular tube, and two adjacent surfaces of the bed-tail support rod are fixedly provided with the sleeve piece.

2. The inserting assembled bedstead according to claim 1, wherein, each of the inserting pieces comprises a transition board and two fixed boards connected to both ends of the transition board and perpendicular to the transition board; one end of each of the two fixed boards away from the transition board is formed with a transition notch in a middle of each of the two fixed boards; a portion of each of the two fixed boards under the transition notch is folded to form an inclined guide board, and the inclined guide board is inclined towards the transition board from top to bottom; there is a gap between a lower end of the inclined guide board and the transition board; the two inclined guide boards are in a same plane, and there is a gap between the two inclined guide boards; the sleeve piece comprises an attaching board, and both sides of the attaching board are folded to form extension boards; each of the extension boards is configured as a shape of a right triangle, and one side of each of the extension boards connected with the attaching board and an upper side of the extension board are two sides of a right angle of the right triangle, respectively; sides of the two extension boards away from the attaching board both extend to form inclined pressing boards and the inclined pressing boards are inclined towards the attaching board from top to bottom; a lower end of each of the inclined pressing boards is welded to the attaching board; an angle formed between the inclined pressing board and the attaching board is equal to an angle between each of the inclined guide boards and the transition board; and two inclined pressing boards are in a same plane, and there is a gap between the two inclined pressing boards.

3. The inserting assembled bedstead according to claim 1, further comprising a support board assembly, wherein a first fastening tape is fixed at an upper side of the bedside longitudinal tube; the support board assembly comprises a plurality of wooden transverse strips and two second fastening tapes; the two second fastening tapes are respectively fixed at one end of individual wooden transverse strips of the plurality of wooden transverse strips, and the first fastening tape is in adhesive connection with the two second fastening tape.

4. The inserting assembled bedstead according to claim 1, further comprising two middle longitudinal pieces, wherein each of the two middle longitudinal pieces comprises a middle longitudinal tube and the inserting pieces fixed at both ends of the middle longitudinal tube, one side of the bed-head transverse tube facing a bed-tail is fixedly provided with the sleeve piece in a middle of the bed-head transverse tube, both sides of the middle transverse tube are fixedly provided with the sleeve pieces in a middle of the middle transverse tube, and one side of the bed-tail transverse tube facing a bed-head is fixedly provided with the sleeve piece in a middle of the bed-tail transverse tube.

5. The inserting assembled bedstead according to claim 1, wherein, each of the inserting pieces comprises a transition board and two fixed boards connected to both ends of the transition board; one end of each of the two fixed boards away from the transition board is formed with a transition notch in a middle of fixed board; a portion of each of the two fixed boards under the transition notch is folded to form an inclined guide board, and the inclined guide board is inclined towards the transition board from top to bottom; the two inclined guide boards formed by folding the two fixed boards are in a same plane, and there is a gap between the two inclined guide boards; the sleeve piece comprises an attaching board welded to the—a bed-head transverse tube of the bed-head transverse piece, and both sides of the attaching board are folded to form extension boards; an end of the extension board away from the attaching board extends to form an inclined pressing board, and the inclined pressing board is inclined from top to bottom towards the attaching board; the two inclined pressing boards are in a same plane, and there is a gap between the two inclined pressing boards; and the inserting pieces are configured to be inserted into the sleeve pieces.

6. The inserting assembled bedstead according to claim 1, further comprising a headboard assembly, wherein the headboard assembly comprises two inserting pieces, and three adjacent surfaces of the bed-head support rod are fixedly provided with the sleeve piece.

7. The inserting assembled bedstead according to claim 6, wherein, the headboard assembly comprises a rectangular frame formed by welding two vertical square tubes and two horizontal square tubes together, a headboard fixed to one side of the rectangular frame towards a bed-tail end, and four bed-head side boards fixed at an upper side, a lower side, a left side and a right side of the headboard, respectively, and surrounding the rectangular frame; a through hole is formed in the bed-head side board fixed at the lower side at a position close to each of the two vertical square tubes, and an adjusting square tube is provided within each through hole; a plurality of adjusting holes penetrating the headboard are uniformly arranged in each of the two vertical square tubes along a length direction, and two perforations are arranged at intervals in the adjusting square tube; a relative position between the adjusting square tube and a corresponding one of the two vertical square tubes is fixed by a fastener passing through the two perforations and the plurality of adjusting holes; and two inserting pieces are fixed to two adjusting square tubes, respectively.

8. The inserting assembled bedstead according to claim 1, wherein, each of the inserting pieces comprises a welding section and an inserting section; the welding section is configured as a U-shape, and both ends of the U-shape are located in a same plane for being fixed by welding; the inserting section is configured as an funnel shape and integrally formed with the welding section; one side of the inserting section is formed with a first gap running through a whole of the inserting section; the sleeve piece is configured as a funnel shape with a gradually decreasing size from top to bottom; and one side of the sleeve piece is formed with a second gap running through a whole of the sleeve piece.

9. The inserting assembled bedstead according to claim 8, wherein, the first gap is located at one side of the inserting section towards a U-shaped opening of the welding section; a projection of a first upper outer ring and a projection of a first lower outer ring of the inserting section in a vertical direction are internally tangent with each other, forming a first tangent point at one side of the inserting section away from the first gap; a projection of a second upper outer ring and a projection of a second lower outer ring of the sleeve piece in the vertical direction are internally tangent with each other, forming a second tangent point at one side of the sleeve piece away from the second gap; a part to be welded with the sleeve piece is formed with a positioning groove, and a length of the positioning groove is same as a length of a welding side of the sleeve piece; and an inner concave surface of the positioning groove is an arc surface attached to an outer surface of the sleeve piece.

* * * * *